(12) United States Patent  
Thornton et al.

(10) Patent No.: US 6,240,429 B1  
(45) Date of Patent: May 29, 2001

(54) USING ATTACHED PROPERTIES TO PROVIDE DOCUMENT SERVICES

(75) Inventors: James D. Thornton, Redwood City; James P. Dourish; Warren K. Edwards, both of San Francisco; Anthony G. LaMarca, Redwood City; John O. Lamping, Los Altos; Karin Peterson, Palo Alto; Michael P. Salisbury, Mountian View; Douglas B. Terry, San Carlos, all of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/143,773

(22) Filed: Aug. 31, 1998

(51) Int. Cl.$^7$ .................................................. G06F 17/21

(52) U.S. Cl. ........................................................ 707/500

(58) Field of Search .................................. 707/201, 514, 707/513, 204, 10, 501, 102, 515, 516, 500; 709/202, 203, 328, 329, 310; 345/335

(56) References Cited

U.S. PATENT DOCUMENTS

| | | | | |
|---|---|---|---|---|
| 5,649,192 | * | 7/1997 | Stucky | 707/103 |
| 5,664,180 | * | 9/1997 | Halpert et al. | 707/102 |
| 5,761,684 | * | 6/1998 | Gibson | 707/515 |
| 5,835,758 | * | 11/1998 | Nochur et al. | 707/102 |
| 5,864,850 | * | 1/1999 | Nordman | 707/10 |
| 6,009,442 | * | 10/1999 | Chen et al. | 707/522 |
| 6,040,832 | * | 3/2000 | Porech et al. | 345/340 |
| 6,049,799 | * | 4/2000 | Mangnat et al. | 707/10 |
| 6,108,661 | * | 8/2000 | Caron et al. | 707/102 |

FOREIGN PATENT DOCUMENTS

WO 91 14222   9/1991   (WO).

OTHER PUBLICATIONS

Buyukkokten, F. et al, "Document Management in Haldoc", IEEE Electrotechnical Conf., v 1, pp. 379–382, Apr. 1994.*

Dykstra–Erickson et al, "The role of user studies in th edesign of OpenDoc", ACM Symposium on Designing Interactive Systems, pp. 111–120, Aug. 1997.*

Sleeter, Melissa E., "OpenDoc—building online help for a component–oriented architecture", Annual ACM Conference on Systems Documentation, pp. 87–94, Apr. 1994.*

Interposition Agents: Transparently Interposing User Code at the System Interface, Michael B. Jones, (Microsoft Research, Microsoft Corp.) Proceedings of the 14th ACM Symposium on Operating System Principles, pp. 80–90; 1993.

(List continued on next page.)

Primary Examiner—Joseph H. Feild  
(74) Attorney, Agent, or Firm—Fay, Sharpe, Fagan, Minnich & McKee, LLP

(57) ABSTRACT

A document management system is provided which organizes, stores and retrieves documents according to properties attached to the documents. A property attachment mechanism allows a user to attach arbitrary static and active properties to a document. The active properties include executable code which activates an external service in response to a triggering event which is predefined by the user, such as an operation performed on the document. When the operation is applied to the document, the operation is compared to the active properties of the document to determine if it is a triggering event. If an active property is triggered, its code is executed which automatically invokes an external service that executes independently from the operation. The results of the service are sent back to the document management system and the operation is then continued. In this manner, a user interacts directly with a document rather than locating, loading and executing an external service to be applied to the document. The user and/or other applications are unaware of the external service being processed.

20 Claims, 5 Drawing Sheets

OTHER PUBLICATIONS

Lifestreams: Organizing Your Electronic Life, Freeman et al., (Yale University, Dept of Computer Science) Proceedings of the CHI 96 Conference Companion on Human Factors in Computing Systems, pp. 410–411; 1996.

The Digital Library Integrated Task Enironment (DLITE), Cousins et al., (Stanford University / Xerox PARC) Jul. 1997.

Semantic File Systems, Gifford et al., (Programming Systems Research Group, 1991 ACM 0–89791–447–3/91/0009/0016).

SLIC: An Extensibility System for Commodity Operating Systems, Ghormley et al., (Computer Science Division, Univ. of CA at Berkley) Feb. 11, 1998.

Finding and Reminding: File Organization from the Desktop, Barreau et al., (SIGCHI, vol. 27, No. 3, Jul. 1995).

Finding and Reminding, Reconsidered, Fertig et al., (SIGCHI, vol. 28, No. 1, Jan. 1996).

Information Visualization using 3D Interactive Animation, Robertson et al., (Communications of the ACM, vol. 36, No. 4, Apr. 1993).

Using a Landscape Metaphor to Represent a Corpus of Documents, Matthew Chalmers, (Rank Xerox EuroPARC, in Proc. European Conf. on Spatial Information Theory, Elba, Sep. 1993).

M. Fredriksson: "Active Documents" Second HK/R Student Conference on Advanced Object–Oriented Concepts, Online!Jan. 17, 1997, pp. 1–10.

M. Fredriksson & M. Svahnberg: "Fargo: Technical Description"Online! 1997, University College of Karlskrona/Ronneby, Ronneby, SE.

Alder R M: "Emerging standards for component software-"Computer, Mar. 1995, USA, vol. 28, No. 3, pp. 68–77.

G. Starovic, V. Cahill & B. Tangney: "An Event–Based Object Model for Distributed Programming" Online! Dec. 1995, Trinity College Dubli, TCD–95–28, Dublin, IE.

A Pile Metaphor for Supporting Casual Organization of Information, Mander et al., (Chi '92, 1992 ACM 0–89791–513–5/92/0005–0627).

Representing Information About Files, Jeffrey Mogul, (Computer Science Dept., Stanford, University, CH2021–4/84/0000/0432$01.00 1984 IEEE).

* cited by examiner-

USING ATTACHED PROPERTIES TO PROVIDE DOCUMENT SERVICES

The following applications are related to the present invention: U.S. Ser. No. 09/143,802, Anthony G. LaMarca, et al., entitled USER LEVEL ACCESSING OF LOW-LEVEL COMPUTER SYSTEM OPERATIONS; U.S. Ser. No. 09/143,551, Karin Petersen, et al., entitled PROPERTY-BASED USER LEVEL DOCUMENT MANAGEMENT; U.S. Ser. No. 09/143,778, Douglas B. Terry, et al., entitled A PROPERTY-BASED MECHANISM FOR FLEXIBLY SUPPORTING FRONT-END AND BACK-END COMPONENTS HAVING DIFFERENT COMMUNICATION PROTOCOLS; U.S. Ser. No. 09/144,143, Warren K. Edwards, et al., entitled ATOMIC AND MOLECULAR DOCUMENTS; U.S. Ser. No. 09/143,555, Michael P. Salisbury, et al, entitled VIRTUAL DOCUMENTS; U.S. Ser. No. 09/144,383, John O. Lamping, et al, entitled SELF CONTAINED DOCUMENT MANAGEMENT BASED ON DOCUMENT PROPERTIES; U.S. Ser. No. Unknown, James P. Dourish, et al., entitled ACTIVE PROPERTIES FOR DYNAMIC SYSTEM CONFIGURATION; U.S. Ser. No. 09/143,777, Warren K. Edwards, et al., entitled EXTENDING APPLICATION BEHAVIOR THROUGH DOCUMENT PROPERTIES; U.S. Ser. No. 09/143,772, Michael P. Salisbury, et al., entitled MAINTAINING DOCUMENT IDENTITY ACROSS FILE SYSTEM INTERFACES; U.S. Ser. No. 09,144,032, Anthony G. LaMarca, et al, entitled CLUSTERING RELATED FILES IN A DOCUMENT MANAGEMENT SYSTEM.

Each of the above applications filed Aug. 31, 1998 and assigned to a common assignee are hereby incorporated by reference.

BACKGROUND OF THE INVENTION

The present invention is directed to document management systems. It finds particular application to a system and method which provides service interaction to a document through the use of properties attached to the document and will be described with particular reference thereto.

The inventors have recognized that a large amount of a user's interaction with a computer has to do with document management, such as storing, filing, organizing and retrieving information from numerous electronic documents. These documents may be found on a local disc, on a network system file server, an e-mail file server, the world wide web, or a variety of other locations. Modem communication delivery systems have had the effect of greatly increasing the flow of documents which may be incorporated within a user's document space, thereby increasing the need for better tools to visualize and interact with the accumulated documents.

The most common tools for organizing a document space rely on a single fundamental mechanism known as hierarchical storage systems, wherein documents are treated as files that exist in directories or folders, which are themselves contained in other directories, thereby creating a hierarchy that provides the structure for document space interactions. Each directory in a hierarchy of directories, will commonly contain a number of individual files. Typically, files and directories are given alpha-numeric, mnemonic names in large storage volumes shared via a network. In such a network, individual users may be assigned specific directories.

A file located in a sub-directory is located by its compound path name. For example, the character string D:\TREE\LIMB\BRANCH\TWIG\LEAF.FIL could describe the location of a file LEAF.FIL whose immediate directory is TWIG and which is located deep in a hierarchy of files on the drive identified by the letter D. Each directory is itself a file containing file name, size, location data, and date and time of file creation or changes.

Navigation through a file system, to a large degree, can be considered as navigation through semantic structures that have been mapped onto the file hierarchy. Such navigation is normally accomplished by the use of browsers and dialog boxes. Thus, when a user traverses through the file system to obtain a file (LEAF.FIL), this movement can be seen not only as a movement from one file or folder to another, but also as a search procedure that exploits features of the documents to progressively focus on a smaller and smaller set of potential documents. The structure of the search is mapped onto the hierarchy provided by the file system, since the hierarchy is essentially the only existing mechanism available to organize files. However, documents and files are not the same thing.

Since files are grouped by directories, associating a single document with several different content groupings is cumbersome. The directory hierarchy is also used to control the access to documents, with access controls placed at every node of the hierarchy, which makes it difficult to grant file access to only one or a few people. In the present invention, separation of a document's inherent identity from its properties, including its membership in various document collections, alleviates these problems.

Other drawbacks include that existing hierarchical file systems provide a "single inheritance" structure. Specifically, files can only be in one place at a time, and so can occupy only one spot in the semantic structure. The use of links and aliases are attempts to improve upon such a limitation. Thus, while a user's conception of a structure by which files should be organized may change over time, the hierarchy described above is fixed and rigid. While moving individual files within such a structure is a fairly straightforward task, reorganizing large sets of files is much more complicated, inefficient and time consuming. From the foregoing it can be seen that existing systems do not address a user's need to alter a file structure based on categories which change over time. At one moment a user may wish to organize the document space in terms of projects, while at some time in the future the user may wish to generate an organization according to time and/or according to document content. A strict hierarchical structure does not allow management of documents for multiple views in a seamless manner resulting in a decrease in the efficiency of document retrieval.

Existing file systems also support only a single model for storage and retrieval of documents. This means a document is retrieved in accordance with a structure or concepts given to it by its author. On the other hand, a user—who is not the author—may wish to retrieve a document in accordance with a concept or grouping different from how the document was stored.

Further, since document management takes place on a device having computational power, there would be benefits to harnessing the computational power to assist in the organization of the documents. For example, by attaching a spell-checker property to a document, it can extend the read operation of a document so that the content returned to the requesting application will be correctly spelled.

The inventors are aware that others have studied the area of document management/storage systems.

DMA is a proposed standard from AIIM designed to allow document management systems from different vendors to interoperate. The DMA standard covers both client and server interfaces and supports useful functionality including collections, versioning, renditions, and multiple-repository search. A look at the APIs show that DMA objects (documents) can have properties attached to them. The properties are strongly typed in DMA and must be chosen from a limited set (string, int, date . . . ). To allow for rich kinds of properties, one of the allowable property types is another DMA object. A list type is allowed to build up big properties. Properties have a unique IDs in DMA. Among the differences which exist to the present invention, is the properties are attached to documents without differentiation about which user would like to see them; properties are stored in the document repository that provides the DMA interface, not independently from it. Similarly, DMA does not provide support for active properties.

WebDAV is another interface designed to allow an extended uniform set of functionality to be attached with documents available through a web server. WebDAV is a set of extensions to the HTTP 1.1 protocol that allow Web clients to create and edit documents over the Web. It also defines collections and a mechanism for associating arbitrary properties with resources. WebDav also provides a means for creating typed links between any two documents, regardless of media type where previously, only HTML documents could contain links. Compared to the present invention, although WebDAV provides support for collections, these are defined by extension (that is all components have to be explicitly defined); and although it provides arbitrary document properties, these live with the document itself and cannot be independently defined for different users, furthermore there is no support for active properties and are mostly geared toward having ASCII (or XML) values.

DocuShare is a simple document management system built as a web-server by Xerox Corporation. It supports simple collections of documents, limited sets of properties on documents and support for a few non-traditional document types like calendars and bulletin boards. It is primarily geared toward sharing of documents of small, self-defined groups (for the latter, it has support to dynamically create users and their permissions.) DocuShare has notions of content providers, but these are not exchangeable for a document. Content providers are associated with the type of the document being accessed. In DocuShare properties are static, and the list of properties that can be associated with a document depends on the document type. Users cannot easily extend this list. System administrators must configure the site to extend the list of default properties associated with document types, which is another contrast to the present invention. Also, in DocuShare properties can be visible to anyone who has read access for the collection in which the document is in. Properties are tightly bound to documents and it is generally difficult to maintain a personalized set of properties for a document, again a different approach than the one described in the present invention.

An operating system "SPIN" from the University of Washington allows users to inject code into the kernel that is invoked when an appropriate system call or system state occurs. (For example, users can inject code that alters paging decisions.) If it has already been done, their technology could be used to make it possible to inject code into the file system to invoke a user's code on read and write. Among the differences between SPIN and the concepts of present invention are that code injected into SPIN runs at the kernel level and users can only express their behaviors in a restricted, safe language in which it is not possible to do "bad things." As such, expressiveness is limited. On the other hand, the properties in the present invention run at the user level, and can have GUIs call out to third party libraries and in general be far more expressive than a kernel injected spindle. Further, the properties of the present invention are expressed in terms of documents, as in "I attach property X to Document Y." The SPIN system, on the other hand, extends a system call such as "read". The example behaviors mentioned above are more easily mapped into a system such as the present invention in which properties are explicitly attached to individual documents.

Other work which allows operating system calls to be extended into user's code include, the article "Interposition Agents: Transparently Interposing User Code and System Interface," by Michael B. Jones in Proceedings of the 14$^{th}$ Symposium on Operating Systems, Principles, Asheville, N.C., December, 1993, pages 80–93. The article "SLIC: An Extensibility System for Commodity Operating Systems," by Douglas P. Ghormley, Steven H. Rodriguez, David Petrou, Thomas E. Anderson, which is to appear in the USENIX 1998 Annual Technical Conference, New Orleans, La., June 1998.

Further, the Windows NT (from Microsoft) has a function called "Filter Drivers" which, once installed, can see the accesses made to a file system. Installing filter drivers is a privileged operation, not available to normal users. As such, a user level mechanism, such as the document properties of the present invention and event dispatching architecture would be needed to allow users to express their desired behaviors.

There are also systems which, in a very specific domain, allow users to apply behaviors when documents are accessed. An example is the Tandem e-mail system, which has a "screen cobal" language and has hooks to find out when events occur. This system allows users to code filters to do custom operations when documents arrive and/or read. One of the differences between this system and the present invention, is that the Tandem system solves the problem in a specific domain and invokes only the user's behaviors when the documents are accessed via the mail application. In the present invention, the behaviors are invoked regardless of the application and regardless of the interface.

The paper, "Finding and Reminding: File Organization From the Desktop", D. Barreau and B. Nardi, SIGCHI Bulletin, 27 (3) July, 1995, reviews filing and retrieval practices and discusses the shortcomings of traditional file and retrieval mechanisms. The paper illustrates that most users do not employ elaborate or deep filing systems, but rather show a preference for simple structures and "location-based searches", exploiting groupings of files (either in folders, or on the computer desktop) to express patterns or relationships between documents and to aid in retrieval.

In response to the Barreau article, the article, "Find and Reminding Reconsidered", by S. Fertig, E. Freeman and D. Gelernter, SIGCHI Bulletin, 28(1) January, 1996, defends deep structure and search queries, observing that location-based retrieval is, "nothing more than a user-controlled logical search." There is, however, one clear feature of location-based searching which adds to a simple logical search—in a location-based system, the documents have been subject to some sort of pre-categorization. Additional structure is then introduced into the space, and this structure is exploited in search and retrieval.

The article "Information Visualization Using 3D Interactive Animation", by G. Robertson, S. Card and J. Mackinlay, Communications of the ACM 36 (4) April, 1993, discusses a location-based structure, an interesting feature is that it is exploited perceptually, rather than cognitively. This moves the burden of retrieval effort from the cognitive to the perceptual system. While this approach may be effective, the information that the systems rely on is content-based, and extracting this information to find the structure can be computationally expensive.

The article "Using a Landscape Metaphor to Represent a Corpus of Documents," Proc. European Conference on Spatial Information Theory, Elba, September, 1993, by M. Chalmers, describes a landscape metaphor in which relative document positions are derived from content similarity metrics. A system, discussed in "Lifestreams: Organizing your Electronic Life", AAAI Fall Symposium: AI Applications in Knowledge Navigation on Retrieval (Cambridge, Mass.), E. Freeman and S. Fertig, November, 1995, uses a timeline as the major organizational resource for managing document spaces. Lifestreams is inspired by the problems of a standard single-inheritance file hierarchy, and seeks to use contextual information to guide document retrieval. However, Lifestreams replaces one superordinate aspect of the document (its location in the hierarchy) with another (its location in the timeline).

The article "Semantic File Systems" by Gifford et al., Proc. Thirteenth ACM Symposium of Operating Systems Principals (Pacific Grove, Calif.) October, 1991, introduces the notion of "virtual directories" that are implemented as dynamic queries on databases of document characteristics. The goal of this work was to integrate an associating search/retrieval mechanism into a conventional (UNIX) file system. In addition, their query engine supports arbitrary "transducers" to generate data tables for different sorts of files. Semantic File System research is largely concerned with direct integration into a file system so that it could extend the richness of command line programming interfaces, and so it introduces no interface features at all other than the file name/query language syntax. In contrast, the present invention is concerned with a more general paradigm based on a distributed, multi-principal property-based system and with how interfaces can be revised and augmented to deal with it; the fact that the present invention can act as a file system is simply in order to support existing file system-based applications, rather than as an end in itself.

DLITE is the Stanford Digital Libraries Integrated Task Environment, which is a user interface for accessing digital library resources as described in "The Digital Library Integrated Task Environment" Technical Report SIDL-WP-1996-0049, Stanford Digital Libraries Project (Palo Alto, Calif.) 1996, by S. Cousins et al. DLITE explicitly reifies queries and search engines in order to provide users with direct access to dynamic collections. The goal of DLITE, however, is to provide a unified interface to a variety of search engines, rather than to create new models of searching and retrieval. So although queries in DLITE are independent of particular search engines, they are not integrated with collections as a uniform organizational mechanism.

Multivalent documents define documents as comprising multiple "layers" of distinct but intimately-related content. Small dynamically-loaded program objects, or "behaviors", activate the content and work in concert with each other and layers of content to support arbitrarily specialized document types. To quote from one of their papers, "A document management infrastructure built around a multivalent perspective can provide an extensible, networked system that supports incremental addition of content, incremental addition of interaction with the user and with other components, reuse of content across behaviors, reuse of behaviors across types of documents, and efficient use of network bandwidth."

Multivalent document behaviors (analogs to properties) extend and parse the content layers, each of which is expressed in some format. Behaviors are tasked with understanding the formats and adding functionality to the document based on this understanding. In many ways, the Multivalent document system is an attempt at creating an infrastructure that can deal with the document format problem by incrementally adding layers of "understanding" of various formats. In contrast, the present invention has an explicit goal of exploring and developing a set of properties that are independent of document format. While properties could be developed that could parse and understand content, it is expected that most will be concerned with underlying storage, replication, security, and ownership attributes of the documents. Included among the differences between the present invention and the Multivalent concepts are that, the Multivalent document system focuses on extensibility as a tool for content presentation and new content-based behaviors; the present invention focuses on extensible and incrementally-added properties as a user-visible notion to control document storage and management.

File systems known as the Andrew File System (AFS), Coda, and Ficus provide a uniform name space for accessing files that may be distributed and replicated across a number of servers. Some distributed file systems support clients that run on a variety of platforms. Some support disconnected file access through caching or replication. For example, Coda provides disconnected access through caching, while Ficus uses replication. Although the immediately described distributed file systems support document (or file) sharing, they have a problem in that a file's hierarchical pathname and its storage location and system behavior are deeply related. The place in the directory hierarchy where a document gets stored generally determines on which servers that file resides.

Distributed databases such as Oracle, SQL Server, Bayou, and Lotus Notes also support shared, uniform access to data and often provide replication. Like some distributed file systems, many of today's commercial databases provide support for disconnected operation and automatic conflict resolution. They also provide much better query facilities than file systems. However, distributed databases suffer the same problems as file systems in that the properties of the data, such as where it is replicated and how it is indexed and so on, are generally associated with the tables in which that data resides. Thus, these properties cannot be flexibly managed and updated. Also, the set of possible properties is not extensible.

A digital library system, known as the Documentum DocPage repository, creates a document space called a "DocBase." This repository stores a document as an object that encapsulates the document's content along with its attributes, including relationships, associated versions, renditions, formats, workflow characteristics, and security. These document objects can be infinitely combined and recombined on demand to form dynamic configurations of document objects that can come from any source.

DocPage supports organization of documents via folder and cabinet metaphors, and allows searching over both document content and attributes. The system also provides checkin/checkout-style version control, full version histories of documents, and annotations (each with its own attributes and security rules). The system also supports workflow-style features including notification of updates. DocBase uses a replicated infrastructure for document storage (see: http://www.documentum.com).

Among the differences between Documentum DocPage and the present invention are: First, in the present system properties are exposed as a fundamental concept in the infrastructure. Further, the present system provides for a radically extensible document property infrastructure capable of supporting an aftermarket in document attributes. Documentum seems to be rather closed in comparison; the possible attributes a document can acquire are defined a priori by the system and cannot be easily extended. Additionally, Documentum does not have the vision of universal access to the degree of the present invention which supports near-universal access to document meta-data, if not document content. In comparison, the scope of Documentum narrows to document access within a closed setting (a corporate intranet).

Regarding the execution of an external service, a traditional way of invoking a service or program is to interact directly with the service, and possibly loading or referencing electronic document files as input. A user is burdened with having to know how to invoke the service and what parameters to use each time the user wishes to use the service.

The present invention contemplates a new and improved method and system for automatically invoking a service for a document and which overcomes the above-referenced problems and others.

SUMMARY OF THE INVENTION

A method of activating a service to be performed on a document in response to a triggering event is provided. A property is logically attached to the document and is configured to activate a service which manipulates the document in response to the triggering event. An operation is associated to the property as the triggering event, where the operation is to be performed on the document which is initiated by an application. The service is independent from the application and is capable of manipulating the document without the application being aware of the manipulating. The application initiates the operation to be performed on the document and the operation is intercepted before being performed. The property attached to the document for which the operation is the triggering event is identified. The service associated to the property triggered by the operation is then activated and the service manipulates the document independent from the application. The operation is then performed on the manipulated document.

In accordance with another aspect of the present invention, a method of activating a service to be performed on a document in response to a triggering event in a document management system is provided. A property is logically attached to the document where the property is configured to activate a service which manipulates the document in response to the triggering event. The triggering event is associated to the property such that the property invokes the service in response to an occurance of the triggering event. An occurrance of the triggering event is monitored and intercepted. The property attached to the document which has the triggering event associated thereto is identified. The service associated to the property triggered by the triggering event is then activated and the service manipulates the document. A result of the service is generated from manipulating the document.

One advantage of the present invention is that a document management system is provided which allows the user to interact directly with an electronic document which is preconfigured to automatically perform external services without the user's knowledge, rather than having the user manually locate and execute an external service and load a target document for manipulation.

Another advantage of the present invention is that a set of properties is maintained for each user independently from all other users. In this manner, a first user can attach and maintain a set of properties for a first document and a second user can attach and maintain a second set of properties for the same first document without interfering with the first user's properties of the first document. This allows different users to request and invoke different services independently. A document is not limited to one set of properties.

Another advantage of the present invention, is that an external service is automatically activated in response to a triggering event where the external service is not limited to executing on the same machine of the triggering event.

Still further advantages of the present invention will become apparent to those of ordinary skill in the art upon reading and understanding the following detailed description of the preferred embodiments.

BRIEF DESCRIPTION OF THE DRAWINGS

The following is a brief description of each drawing used to describe the present invention, and thus, are being presented for illustrative purposes only and should not be limitative of the scope of the present invention, wherein.

DETAILED DESCRIPTION OF THE PREFERRED EMBODIMENT

Figure 1:
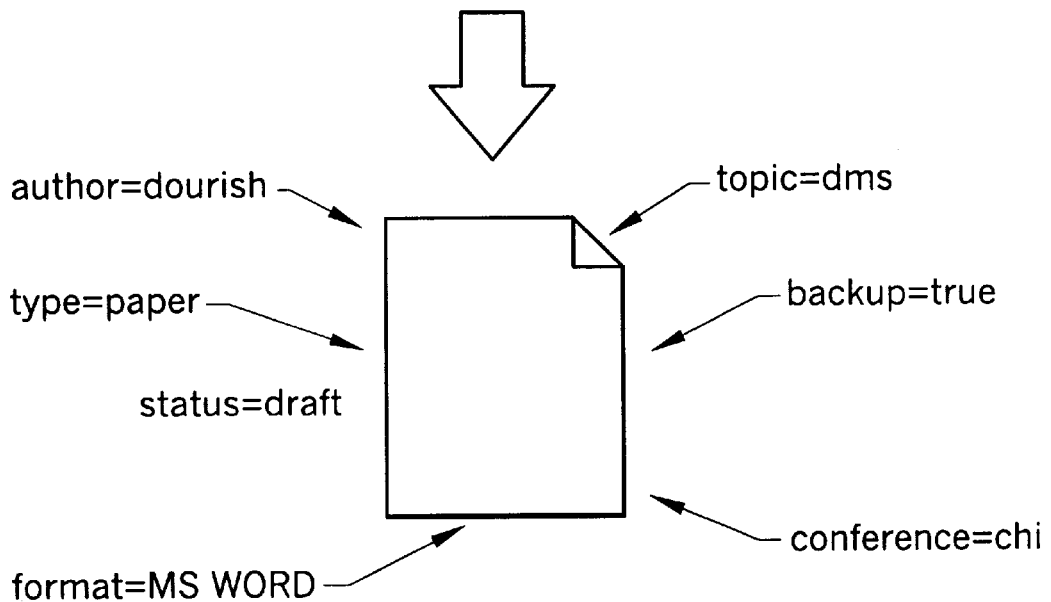
FIG. 1 shows a hierarchical storage mechanism compared to the concept of properties of the present invention.

Prior to discussing the present invention in greater detail, it is believed a glossary of terms used in the description would be beneficial. Therefore, the following definitions are set forth:

Action: The behavior part of a property.

Active Property: A property in which code allows the use of computational power to either alter the document or effect another change within the document management system.

Arbitrary: Ability to provide any property onto a document.

Base Document: Corresponds to the essential bits of a document. There is only one Base Document per document. It is responsible for determining a document's content and may contain properties of the document, and it is part of every principal's view of the document.

Base Properties: Inherent document properties that are associated with a Base Document.

Bit Provider: A special property of the base document. It provides the content for the document by offering read and write operations. It can also offer additional operations such as fetching various versions of the document, or the encrypted version of the content.

Browser: A user interface which allows a user to locate and organize documents.

Collection: A type of document that contains other documents as its content.

Combined Document: A document which includes members of a collection and content.

Content: This is the core information contained within a document, such as the words in a letter, or the body of an e-mail message.

Content Document: A document which has content.

Distributed: Capability of the system to control storage of documents in different systems (i.e., file systems, www, e-mail servers, etc.) in a manner invisible to a user. The system allows for documents located in multi-repositories to be provided to a principal without requiring the principal to have knowledge as to where any of the document's content is stored.

DMS: Document Management System

Document: This refers to a particular content and to any properties attached to the content. The content referred to may be a direct referral or an indirect referral. The smallest element of the DMS. There are four types of documents; Collection, Content Document, No-Content Document and Combined Document.

Document Handle: Corresponds to a particular view on a document, either the universal view, or that of one principal.

DocumentID: A unique identifier for each Base Document. A Reference Document inherits the DocumentID from its referent. Document identity is thus established via the connections between Reference Document References and Base Documents. Logically, a single document is a Base Document and any Reference Documents that refer to it.

Kernel: Manages all operations on a document. A principal may have more than one kernel.

Multi-Principal: Ability for multiple principals to have their own set of properties on a Base Document wherein the properties of each principal may be different.

Notification: Allows properties and external devices to find out about operations and events that occur elsewhere in DMS.

No Content Document: A document which contains only properties.

Off-the-Shelf Applications: Existing applications that use protocols and document storage mechanisms provided by currently existing operating systems.

Principal: A "User" of the document management system. Each person or thing that uses the document management system is a principal. A group of people can also be a principal. Principals are central because each property on a document can be associated with a principal. This allows different principals to have different perspectives on the same document.

Property: Some bit of information or behavior that can be attached to content. Adding properties to content does not change the content's identity. Properties are tags that can be placed on documents, each property has a name and a value (and optionally a set of methods that can be invoked).

Property Generator: Special case application to extract properties from the content of a document.

Reference Document: Corresponds to one principal's view of a document. It contains a reference to a Base Document (Reference Document A refers to Base Document B) and generally also contains additional properties. Properties added by a Reference Document belong only to that reference; for another principal to see these properties, it must explicitly request them. Thus, the view seen by a principal through his Reference Document is the document's content (through the Base Document), and a set of properties (both in the reference and on the Base Document). Even an owner of a Base Document can also have a Reference Document to that base, in which he places personal properties of the document that should not be considered an essential part of the document and placed in all other principal's view.

Space: The set of documents (base or references) owned by a principal.

Static Property: A name-value pair associated with the document. Unlike active properties, static properties have no behavior. Provides searchable meta-data information about a document.

Introduction

As discussed in the background of the invention, the structure that file systems provide for managing files becomes the structure by which users organize and interact with documents. However, documents and files are not the same thing. The present invention has as an immediate goal to separate management of properties related to the document or concerning the document from the management of the document content. Therefore, user-specific document properties are managed close to the document consumer or user of the document rather than where the document is stored. Separation of the management of user properties from the document content itself provides the ability to move control of document management from a closed file system concept to a user-based methodology.

FIG. 1 illustrates a distinction between hierarchical storage systems whose documents are organized in accordance with their location described by a hierarchical structure and the present invention where documents are organized according to their properties (e.g. author=dourish, type=paper, status=draft, etc.). This means documents will retain properties even when moved from one location to another, and that property assignment can have a fine granularity.

Figure 2:
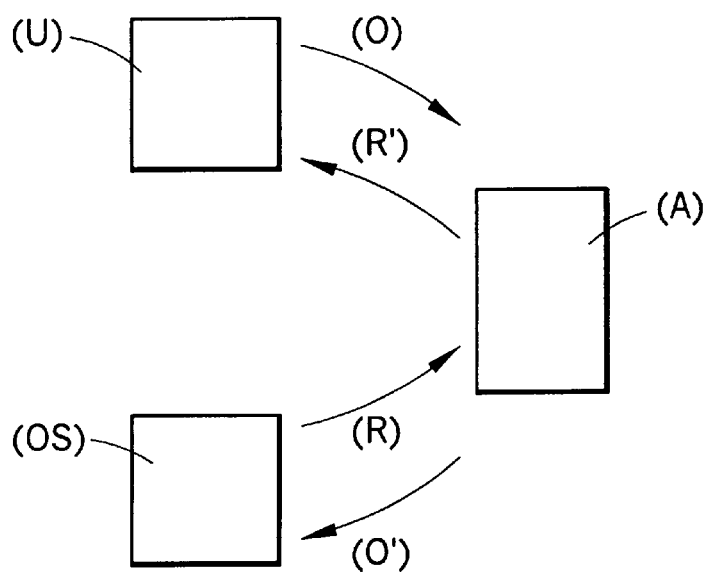
FIG. 2 is a block diagram of a document management system according to the present invention, interposed within a communication channel between a user and an operating system.

To integrate properties within the document management system of the present invention, the properties need to be presented within the content and/or property read/write path of a computer system, with the ability to both change the results of an operation as well as take other actions. The outline of the concept is described in FIG. 2, where once user (U) issues an operation request (O), prior to that operation being performed by operating system (OS), a call is made to document management system (DMS) A of the present invention, which allows DMS A to function so as to achieve the intended concepts of the present invention. This includes having DMS A interact with operating system (OS), through its own operation request (O'). Once operation request (O') is completed, the results are returned (R) to DMS A which in turn presents results (R') to user (U).

With these basic concepts having been presented, a more detailed discussion of the invention is set forth below.

Document Management System (DMS) Architecture

Figure 3:
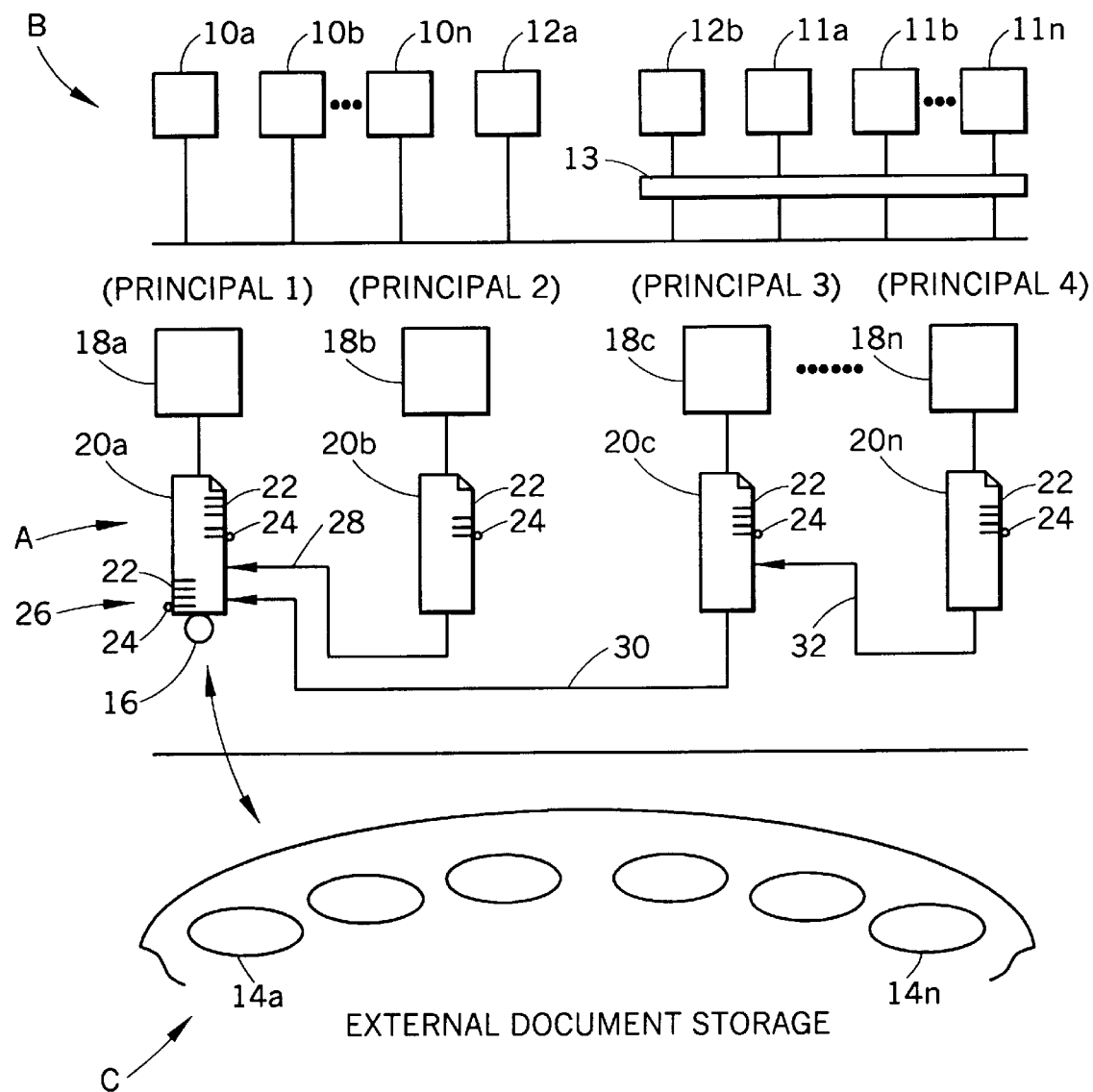
FIG. 3 is a representation of a document management system of the present invention implemented in a computer system.

FIG. 3 sets forth the architecture of a document management system (DMS) A of the present invention in greater detail.

Document management system (DMS) A is shown configured for operation with front-end components B, and back-end components C. Front-end components B include applications 10a–10n and 11a–11n, such as word processing applications, mail applications among others. Some of the applications are considered DMS aware 10a–10n which means these applications understand DMS protocols for storing, retrieving and otherwise interacting with DMS A.

Other components are considered non-DMS aware 11a–11n. Browsers 12a (DMS aware) and 12b (non-DMS aware) are considered specialized forms of applications. In order for the non-DMS-aware applications 11a–11n and 12b to be able to communicate with DMS A, front-end translator 13 is provided.

Similarly, back-end components C can include a plurality of repositories 14a–14n, where the content of documents are stored. Such repositories can include the hard disc of a principal's computer, a file system server, a web page, a dynamic real time data transmission source, as well as other data repositories. To retrieve data content from repositories 14a–14n, bit providers, such as bit provider 16, are used. These bit providers are provided with the capability to translate appropriate storage protocols.

Principals 1-n each have their own kernel 18a–18n for managing documents, such as documents 20a–20n. Documents 20a–20n are considered to be documents the corresponding principal 1-n has brought into its document management space. Particularly, they are documents that a principal considers to be of value and therefore has in some manner marked as a document of the principal. The document, for example, may be a document which the principal created, it may be an e-mail sent or received by the principal, a web page found by the principal, a real-time data input such as an electronic camera forwarding a continuous stream of images, or any other form of electronic data (including video, audio, text, etc.) brought into the DMS document space. Each of the documents 20a–20n have static properties 22 and/or active properties 24 placed thereon.

Document 20a, is considered to be a base document and is referenced by reference documents 20b–2c. As will be discussed in greater detail below, in addition to base document 20a having static properties 22 and/or active properties 24, base document 20a will also carry base properties 26 which can be static properties 22 and/or active properties 24. Static properties are shown with a "–" and active properties are shown with a "–o".

Reference documents 20b–2c are configured to interact with base document 20a. Both base documents and reference documents can also hold static properties 22 and/or active properties 24. When principals 2,3 access base document 20a for the first time, corresponding reference documents 20b–2c are created under kernels 18b–18c, respectively. Reference documents 20b–2c store links 28 and 30 to unambiguously identify their base document 20a. In particular, in the present invention each base document is stored with a document ID which is a unique identifier for that document. When reference documents 20b–2c are created, they generate links to the specific document ID of their base document. Alternatively, if principal n references reference document 2c, reference document 20n is created with a link 32 to reference document 20c of Principal 3. By this link principal n will be able to view (i.e. its document handle) the public properties principal 3 has attached to its reference document 2c as well as the base properties and public reference properties of base document 20a. This illustrates the concept of chaining.

The above described architecture allows for sharing and transmission of documents between principals and provides the flexibility needed for organizing documents. With continuing attention to FIG. 3, it is to be noted at this point that while links 28–30 are shown from one document to another, communication within DMS A is normally achieved by communication between kernels 18a–18n. Therefore, when DMS A communicates with either front-end components B, back-end components C, or communication occurs between principals within DMS A, this communication occurs through kernels 18a–18n. It is however, appreciated the invention will work with other communication configurations as well. Using the described architecture, DMS A of the present invention does not require the principal to operate within a strict hierarchy such as in file or folder-type environments. Rather, properties 22,24 which are attached to documents allows a principal to search and organize documents in accordance with how the principal finds it most useful.

For instance, if principal 1 (owner of kernel 18a) creates a base document with content, and stores it within DMS A, and principal 2 (owner of kernel 18b) wishes to use that document and organize it in accordance with its own needs, principal 2 can place properties on Reference Document 20b. By placement of these properties, principal 2 can retrieve the base document in a manner different than that envisioned by principal 1.

Further, by interacting with browser 12, a principal may run a query requesting all documents having a selected property. Specifically, a user may run query language requests over existing properties.

Therefore, a point of the present invention is that DMS A manages a document space where properties are attached by different principals such that actions occur which are appropriate for a particular principal, and are not necessarily equivalent to the organizational structure of the original author of a document or even to other principals.

Another noted aspect of the present invention is that since the use of properties separates a document's inherent identity from its properties, from a principal's perspective, instead of requiring a document to reside on a single machine, documents in essence can reside on multiple machines (base document 20a can reside on all or any one of kernels 18a–18n). Further, since properties associated with a document follow the document created by a principal (for example, properties on document 20b of kernel 18b, may reference base document 20a), properties of document 20b will run on kernel 18b, even though the properties of document 20b are logically associated with base document 20a. Therefore, if a property associated with document 20b (which references base document 20a) incurs any costs due to its operation, those costs are borne by kernel 18b (i.e. principal 2), since properties are maintained with the principal who put the properties onto a document.

A DMS document interface provides access to documents as Java objects. Applications can make use of this interface by importing the relevant package in their Java code, and coding to the API provided for accessing documents, collections and properties. This is the standard means to build new DMS-aware applications and to experiment with new interaction models. DMS Browser 12 (of FIG. 3) can be regarded as a DMS application and is built at this level. the DMS document interface provides Document and Property classes, with specialized subclasses supporting all the functionality described here (such as collections, access to WWW documents, etc.). Applications can provide a direct view of DMS documents, perhaps with a content-specific visualization, or can provide a wholly different interface, using DMS as a property-based document service back-end.

Another level of access is through translators (such as translator 13 of FIG. 3). In an existing embodiment, a server implementing the NFS protocol is used as the translator. This is a native NFS server implementation in pure Java. The translator (or DMS NFS server) provides access to the DMS document space to any NFS client; the server is used to allow existing off-the-shelf applications such as Microsoft Word to make use of DMS documents; on PC's, DMS simply looks like another disk to these applications, while on UNIX machines, DMS A looks like part of the standard network filesystem.

Critically, though, what is achieved through this translator is that DMS A is directly in the content and property read/write path for existing or off-the-shelf applications. The alternative approach would be to attempt to post-process files written to a traditional filesystem by applications, such as Word, that could not be changed to accommodate DMS A. By instead providing a filesystem interface directly to these applications, it makes it possible to execute relevant properties on the content and property read/write path. Furthermore, it is ensured that relevant properties (such as ones which record when the document was last used or modified) are kept up-to-date. Even though the application is written to use filesystem information, the DMS database remains up to date, because DMS A is the filesystem.

As part of its interface to the DMS database layer, NFS provides access to the query mechanism. Appropriately formatted directory names are interpreted as queries, which appear to "contain" the documents returned by the query. Although DMS provides this NFS service, DMS is not a storage layer. Documents actually live in other repositories. However, using the NFS layer provides uniform access to a variety of other repositories (so that documents available over the Web appear in the same space as documents in a networked file system). The combination of this uniformity along with the ability to update document properties by being in the read and write path makes the NFS service a valuable component for the desired level of integration with familiar applications. It is to be appreciated that while a server implementing NFS protocol is discussed other servers could also be used. Furthermore, it is to be appreciated that the use of Java is only one implementation option, and that other languages can be used.

Property Attachment

Figure 4:
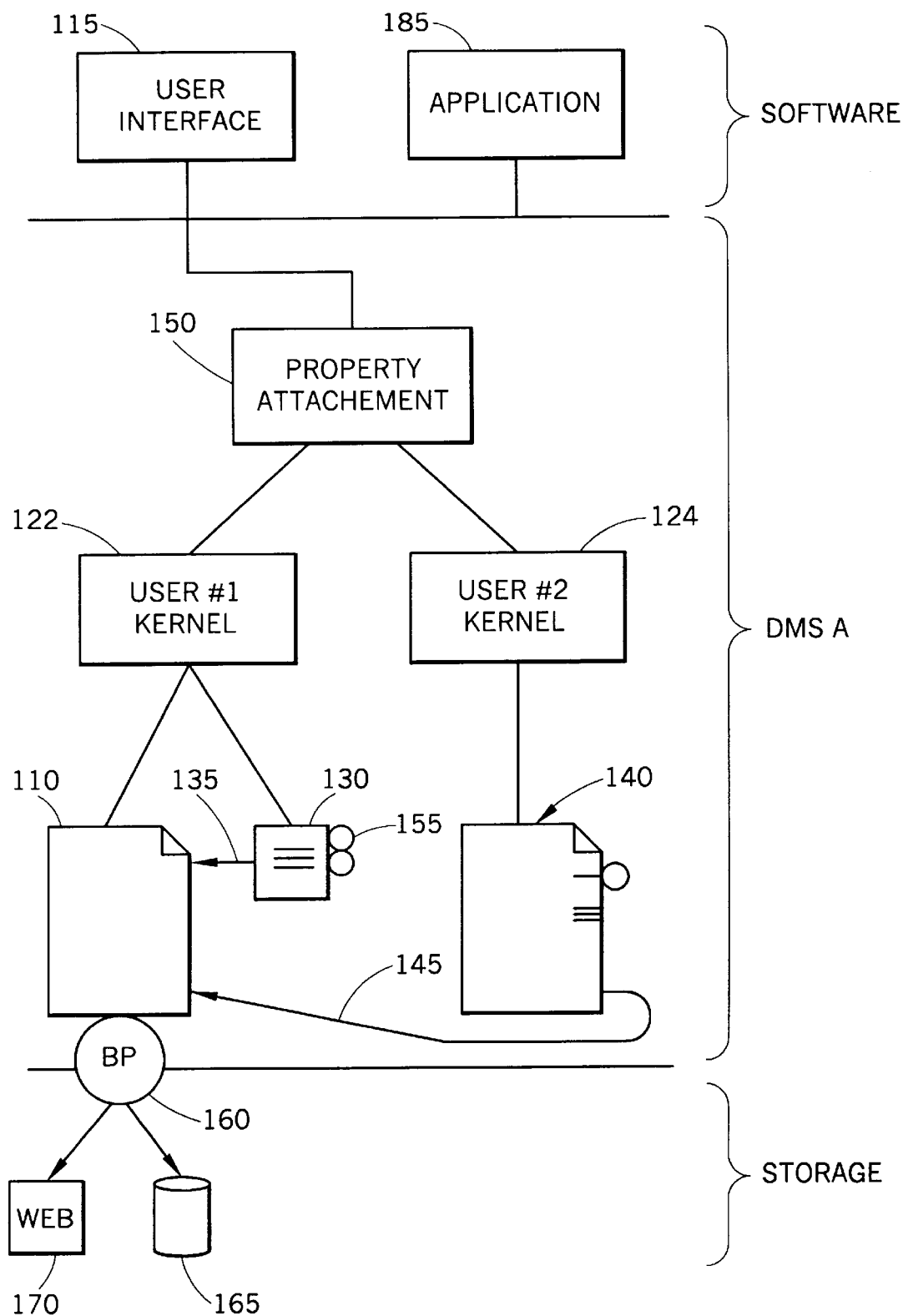
FIG. 4 is a configuration of the present document management system which allows properties to be attached to documents.

FIG. 4 shows an overall system for attaching properties to a document 110. A user interface 115 allows a user to select a desired document and select one or more properties to be attached to the selected document. A document management system A locates and retrieves the selected document in accordance with its management system protocol. In the Preferred Embodiment, documents are stored and retrieved based on their properties rather than hierarchial path and file names.

In FIG. 4, the selected document 110 is found to be owned by user #1. However, the user wishing to attach a property to document 110 can be any user in the system. The document management system A maintains properties on a per user per document basis using individual kernels. Kernel 122 manages documents and properties for user #1 and kernel 124 manages documents and properties for user #2. Thus, a user #1 can generate a set of properties 130 for document 110 (associated via link 135) which are independent from the properties 140 of user #2 (associated via link 145) for document 110.

A property attachment mechanism 150 is provided by the document management system A which generates, configures and attaches properties 130 to the document 110 using association links 135. In the preferred embodiment, the document 110 is identified by a unique ID and the property references the document using the same unique ID. The properties 130 include static properties (represented by horizontal lines) and active properties (represented by circles). Static properties are simple name-value pairs on documents which are relevant to a user, for example, "author=Joe" or "topic=interesting." An active property 155 has a name-value and includes executable program code and/or instructions for automatically performing an operation or service without a user's involvement. Documents can be collected, searched and retrieved based on static properties and/or active properties.

The active property 155 is configured to be activated by a triggering event which is defined by the user. Attaching the active property 155 to the document 110 forms an association between the property and the document. The association is external to the data that represents the content of the document 110. Thus, the association is independent of content type, the application format used to generate the document, and other characteristics of the document 110. The content of document 110 is controlled by a bit provider 160 which identifies the location of the data (eg. local disk 165, world wide web 170, a camera, or any data supplying source), indicates how the data from the sources are combined to form the content of the document 110, includes a translation interface to communicate to the data source, and other selected parameters which define the content.

Service Invocation

Figure 5:
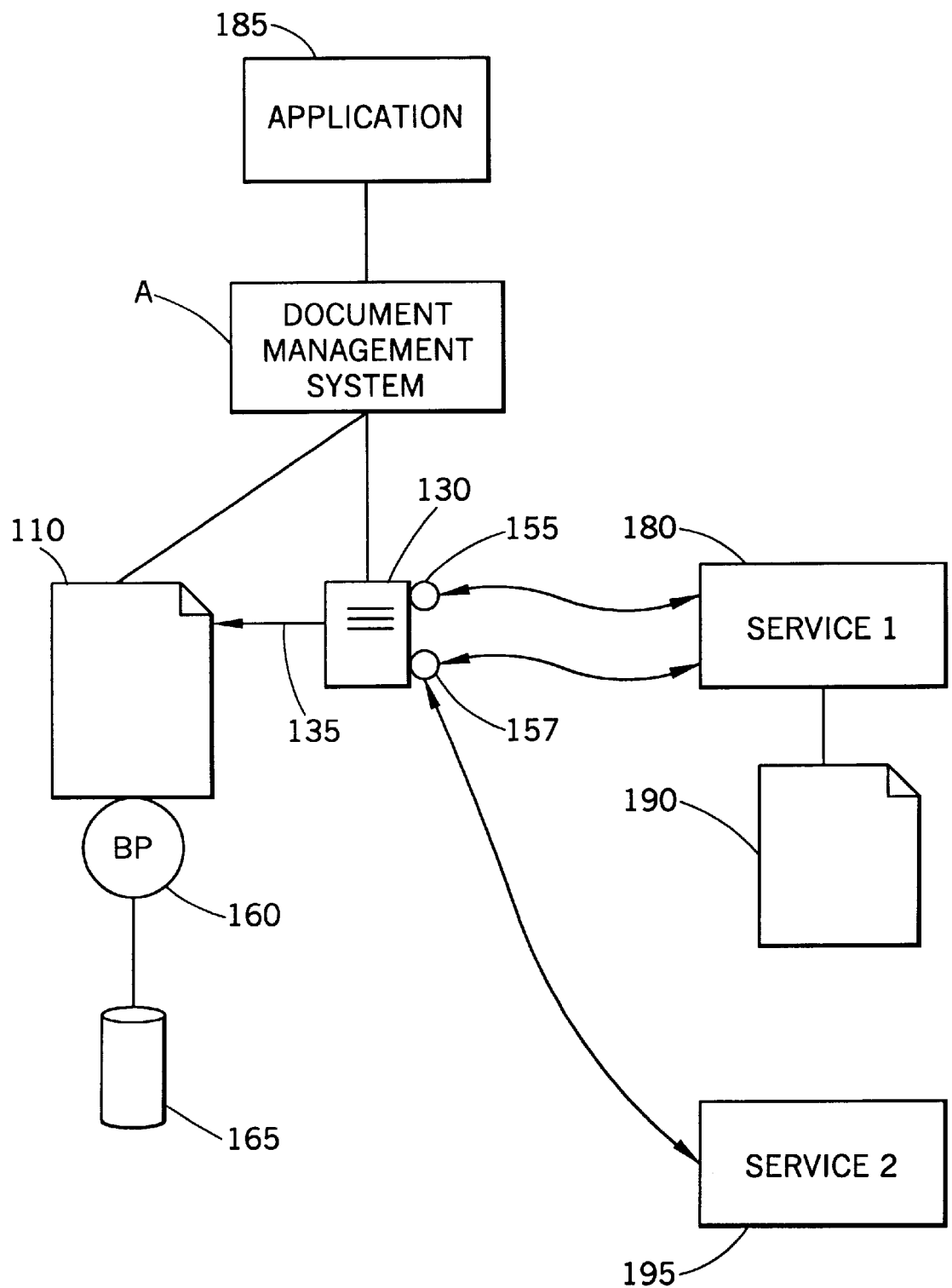
FIG. 5 illustrates a document having attached properties which are linked to external services; and in accordance with the present invention.

With reference to FIG. 5, in the Preferred Embodiment, the active property 155 is configured to automatically invoke an external service or program 180 based on a triggering event. Thus, rather than having a user or application 185 interact directly with the service 180 by locating and executing the service and loading the document 110 as an input file, the active property 155 allows a user or application 185 to interact directly with the electronic document 110 and the active property 155 controls the activation of the service 180.

With further reference to FIG. 5, for exemplary purposes, a user wishes to have the content of document 110 translated from English to French whenever the user tries to "read" the document. An active property 155 can be attached to document 110 which translates the content of the document from English to French in response to a triggering event. The triggering event in this example is set to a "read content" operation which is applied to the document 110 by any application 185, such as a word processor. Since the application 185 accesses the document 110 through the document management system A, the document management system A intercepts all operations applied to document 110 and compares them to the list of properties 130 associated to document 110.

As explained previously, each user maintains a personal list of properties for each document whether or not they own the document. Before the "read content" operation is performed on the document 110, the operation is checked as being a potential triggering event for an active property. In this case, active property 155 defines the "read content" operation as a triggering event. Therefore, the program code of active property 155 is executed which activates an external translation service 180. The translation service 180 executes independently from the application 185 and unknown to the application 185. The active property 155 further functions as a communication interface between the translation service 180 and the document management system A to communicate the results of the service.

Here, the content of document 110 is manipulated by the translation service such that it is translated from English to French and a French version 190 is generated as a result. Once the service is completed, rather than executing the "read content" operation on the original content of document 110, the document management system A applies the operation to the French version 190 and the application 185 receives the French translation completely unaware that the original document 110 is actually in English. Thus, an operation such as a "read content" command which is applied directly to a document, is defined to automatically invoke an external service without having to directly interact with the external service.

With further reference to FIG. 5, by way of another example, a triggering event can be assigned to an event which is not initiated by an application. Suppose a user wishes to ensure that document 110 is backed-up every night. Rather than requiring the user to run a back-up program or check the parameters of a back-up service, the user would simply attach an active property 157 to the document 110 which is a back-up property instance that controls and expresses the request for back-up service for the document. The back-up property 157 is programmed to activate a selected back-up service 195 which can reside on the user's system, a network accessed system, or other remote site such as on the Internet. The back-up property 157 is further configured to identify a triggering event which will cause the activation of the back-up property, for example, when the system clock becomes 12:00 am. Once configured, a user or application will be unaware of the triggering event and will be unaware of the service being performed in response to the triggering event because the service runs independently. As further seen, property 157 can also include code to activate other services concurrently, such as service 180, based on the same triggering event.

There are different ways of expressing a precise service request through a property attachment. A service may be directly represented by a type of property instance. Thus, an Acme Back-up Service may include a preconfigured Acme back-up property which is attachable to a document which automatically invokes the Acme Back-up Service upon a triggering event. On the other hand, a general property-like back-up may rely on parameters, eg. in sub-properties, to specify details of the request. In that case, a user may specify Acme as the preferred service provider for the back-up property instance. In general, specific services can rely on parameters. For example, the user can specify a back-up interval when the Acme back-up property is attached.

The results of a service requested by an active property attachment can be reported or delivered to the user through documents and property instances in a number of ways: (1) Additional property instances may be attached to the original document. For example, the Acme Back-up Service might attach an Acme back-up date property to a document when a back-up copy is made. The property value or subproperties would supply the date and time of the latest copy. (2) New documents may be generated, possibly with properties attached and linked to the original document through an attached property. Thus, a translation service which creates a new document containing the translation, can attach a French version property to the original document which points to the new French version document. (3) The content of the original document may be modified.

Additionally, services invoked through an active property attachment can have effects and results that are not conveyed through documents and property instances such as: (1) arranging a certain quality of service for access to the document, (2) maintaining guarantees of reliability, fault tolerance, durability, etc., (3) direct user interaction through user interfaces implemented by the service or by code that is included in the active property.

The present system includes a number of alternative variations in the manner by which a service software comes to operate on a document once an active property is attached to request the service. These include a service query, attached code, hybrid, and a composite. Using a service query, a given service or program may be implemented as a long-running process which either routinely queries the document management system to determine which documents have certain property instances attached or requests notifications of such property attachments. Upon discovering or being notified of a document with a new service request, the program or service would operate on it.

Using attached code, the given service or program may supply software to be included in or referenced by any instance of a particular property type. The software supplied includes entry points which may be called by the document management system when various interesting/triggering events occur. For example, the document management system may call an entry point when the content of a document is changed. The service-supplied software at the entry point could then perform whatever steps are appropriate based on the event. In particular, the service-supplied software would be invoked at the time when the property instance is first attached to a document.

In the hybrid variation, a given service or program relies on both of the above methods by having the code included in the property instance perform notification of the long-running process. In such a situation, the communication between property code and long-running process is determined by the service implementor. Under the composite variation, a given service may be delivered merely by combining other services or by enabling basic functionality of the document management system. Attaching a composite property instance would cause automatic attachment of several other property instances to invoke individual services that collectively provide the composite service.

Figure 6:
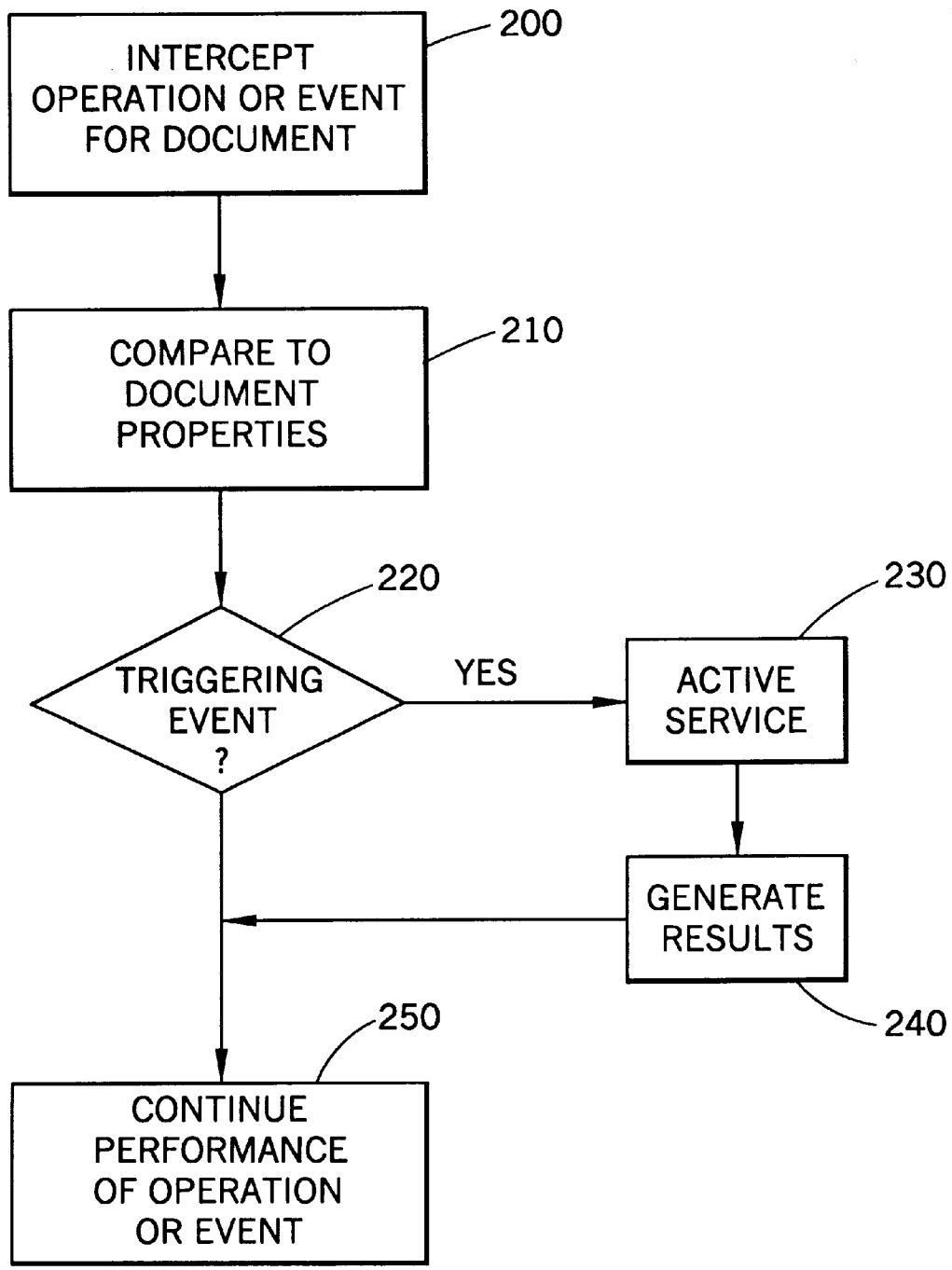
FIG. 6 illustrates an exemplary block diagram of an operation triggering an external service.

With reference to FIG. 6, an exemplary block diagram of a service activation is shown. Once an active property is configured with a triggering event and executable code which initiates an external service, a document is capable of activating the external service. The triggering event can be any assigned operation or event which is initiated by any function on the system. For example, the triggering event can be initiated by an application, by the system, by another document, by another active property, by a timer or any mechanism desired by a user.

As an operation is applied to a document, the operation is intercepted 200 by the document management system and the operation is compared 210 to the properties of the document to determine whether any of the active properties have been defined to include the current operation as a triggering event 220. If the operation triggers an active property, the program code associated with the active property is executed which activates 230 an external service. The operation can be any associated event such as a request from an application processing the document or simply a system event such as a date or time.

The external service executes and, using its associated active property as a communication interface, accesses the document and/or the document management system and generates 240 a result of the service. A service can manipulate the target document by modifying its content or perform other tasks without modifying the target document's content, such as, making back-up copies of the target document, creating new properties for the document, etc. Once the external service completes its task, the original operation is then continued 250 if it is an executable operation, as opposed to simply an occurrence of a system parameter such as a timer which would have no further execution to continue. If the content of the document was modified by the external service, then the operation is performed on the modified document rather than the original document. Of course, this can be changed based on the instructions of the active property. This process of activating external services is performed automatically without a user's intervention and is performed independently of the user or an application processing the document.

Existing systems such as Windows offer users a way to view and control properties of files. Some of these properties are independent of document content, while others take content into account. Some property pages do allow users to request services such as maintenance of access logs for auditing, but these services are simply features of the operating system itself. Conversely, the present system provides a mechanism for interaction with different external services which are provided independently from the operating system or document management system controlling the target document. The prior systems have shortcomings by not providing the generality of the present system which allows a user to exercise direct control over the set of property instances attached to a document regardless of the nature of the contents of that document and on a per user basis.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, we now claim:

1. A method of activating a service to be performed on an electronic document in response to a triggering event, the method comprising the steps of:

logically attaching a property to the electronic document, the property being configured to activate the service for manipulating the electronic document in response to the triggering event;

associating an operation to the property as the triggering event, the operation being one to be performed on the electronic document which is initiated by an application, the service being independent from the application and capable of manipulating the electronic document without the application being aware of the manipulating;

initiating, by the application, the operation to be performed on the electronic document;

intercepting the operation before being performed on the electronic document;

identifying the property attached to the electronic document for which the operation is the triggering event;

activating the service associated to the property triggered by the operation, the service manipulating the electronic document independent from the application; and performing the operation on the manipulated document.

2. The method as set forth in claim 1 wherein the property is configured having instructions for activating the service such that the service executes on the document and manipulates the document in response to the triggering event.

3. The method as set forth in claim 1 wherein the document includes content and the manipulating includes changing the content of the document.

4. The method as set forth in claim 1 wherein the document includes content and the manipulating includes generating a result without changing the content of the document.

5. The method as set forth in claim 1 wherein the manipulated document is separate from the document.

6. The method as set forth in claim 1 wherein the property is attached to the document such that the application unintentionally activates the service by initiating the operation to be performed on the document.

7. The method as set forth in claim 1 further including logically attaching a plurality of properties to the document, each of the properties being configured to activate a service upon a triggering event where the triggering event is an operation performed on the document by an application, the service being independent from the application.

8. The method as set forth in claim 1 wherein the property is configured to activate a plurality of services in response to the triggering event.

9. The method as set forth in claim 1 wherein the performing the operation on the manipulated document includes generating a result to the application, the result being different than a result which would be generated by the operation being performed on the document without activating the service.

10. The method as set forth in claim 1 further including logically attaching a property to the document by a plurality of users where each property attached by each of the users is maintained independently for each of the users.

11. The method as set forth in claim 1 wherein the service activated is executed by an operating system which is different than an operating system executing the application.

12. In a document management system, a method of activating a service to be performed on an electronic document in response to a triggering event, the method comprising the steps of:

logically attaching a property to the electronic document, the property being configured to activate a service for manipulating the document in response to the triggering event;

associating the triggering event to the property such that the property invokes the service in response to an occurrence of the triggering event;

monitoring for an occurrence of the triggering event;

intercepting the triggering event;

identifying the property attached to the electronic document which has the triggering event associated thereto;

activating the service associated to the property triggered by the triggering event, the service manipulating the electronic document; and generating a result of the service from manipulating the document.

13. The method as set forth in claim 12 wherein the triggering event is an operation intiated by an application for processing the document.

14. The method as set forth in claim 12 wherein the triggering event is a system parameter.

15. The method as set forth in claim 12 wherein the service routinely sends queries to the document management system to determine which documents have attached properties associated to the service.

16. The method as set forth in claim 12 wherein the document includes content and the generating includes changing the content of the document.

17. The method as set forth in claim 12 wherein the document includes content and the result is generated without changing the content of the document.

18. A method of activating a service to be performed on a content containing document in response to a triggering event, the method comprising the steps of:

logically attaching an active property to the document, the active property being configured having instructions for activating the service such that the service executes on the document and manipulates the document in response to the triggering event;

associating an operation to the active property as the triggering event, the operation being one to be performed on the document which is initiated by an application, the service being independent from the application and capable of manipulating the document without the application being aware of the manipulating;

initiating, by the application, the operation to be performed on the document;

intercepting the operation before being performed on the document;

identifying the active property attached to the document for which the operation is the triggering event;

activating the service associated to the active property triggered by the operation, the service manipulating the document independent from the application, wherein manipulating includes changing the content of the document; and performing the operation on the manipulated document.

19. The method as set forth in claim 18 wherein the manipulated document is separate from the document.

20. The method as set forth in claim 18 wherein the active property is attached to the document such that the application unintentionally activates the service by initiating the operation to be performed on the document.

* * * * *